US012561570B2

(12) United States Patent
Rajarathinam et al.

(10) Patent No.: US 12,561,570 B2
(45) Date of Patent: Feb. 24, 2026

(54) METHODS AND ARRANGEMENTS TO IDENTIFY FEATURE CONTRIBUTIONS TO ERRONEOUS PREDICTIONS

(71) Applicant: Capital One Services, LLC, McLean, VA (US)

(72) Inventors: Nanda Kumar Trichy Rajarathinam, McLean, VA (US); Evan Engel, McLean, VA (US); Madhav Khosla, McLean, VA (US); Leela Prabhu, McLean, VA (US); Kevin Wu, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/196,986

(22) Filed: May 12, 2023

(65) Prior Publication Data

US 2023/0281455 A1 Sep. 7, 2023

Related U.S. Application Data

(63) Continuation of application No. 17/521,548, filed on Nov. 8, 2021, now Pat. No. 11,715,015, which is a continuation of application No. 16/229,934, filed on Dec. 21, 2018, now Pat. No. 11,200,461.

(51) Int. Cl.
| | |
|---|---|
| *G06N 3/084* | (2023.01) |
| *G06F 18/21* | (2023.01) |
| *G06F 18/2113* | (2023.01) |
| *G06F 18/214* | (2023.01) |

(Continued)

(52) U.S. Cl.
CPC ......... *G06N 3/084* (2013.01); *G06F 18/2113* (2023.01); *G06F 18/214* (2023.01); *G06F 18/217* (2023.01); *G06N 5/04* (2013.01); *G06N 20/00* (2019.01)

(58) Field of Classification Search
CPC .......... G06N 5/04; G06N 20/00; G06N 3/084; G06N 3/045; G06F 18/2113; G06F 18/214; G06F 18/217
See application file for complete search history.

(56) References Cited

U.S. PATENT DOCUMENTS

| | | | |
|---|---|---|---|
| 9,240,360 B2 * | 1/2016 | Baseman ......... | G05B 19/41875 |
| 2004/0059518 A1 * | 3/2004 | Rothschild .............. | G06F 17/18 |
| | | | 702/18 |

(Continued)

*Primary Examiner* — Oluwatosin Alabi
(74) *Attorney, Agent, or Firm* — KDW Firm PLLC

(57) ABSTRACT

Logic may identify feature contributions to erroneous predictions by predictive models. Logic may provide a set of two or more models. Each model may train based on a training dataset and test based on a testing dataset and two or more models may be unique. Logic may test the set during a monitoring period. Logic may perform residual modeling on each model in the set during the monitoring period and may determine a list of input features that contribute to a residual of each model of the set. A residual comprises a difference between a predicted result and an expected result. Logic may generate a combined list of the input features from the set and may rank the input features. Logic may perform a voting process to generate the ranks for the input features. And logic may classify features as exogenous or endogenous based on a threshold and the ranks.

18 Claims, 7 Drawing Sheets

(51)  Int. Cl.
      *G06N 5/04*            (2023.01)
      *G06N 20/00*           (2019.01)

(56)                    References Cited

U.S. PATENT DOCUMENTS

2004/0215726  A1*  10/2004  Arning ................... G06F 40/274
                                                          709/206
2007/0100724  A1*   5/2007  Hollas .................... G06Q 40/00
                                                          705/36 R
2012/0054184  A1*   3/2012  Masud .................. G06F 16/285
                                                          707/E17.091
2012/0284213  A1*  11/2012  Lin .......................... G06N 3/08
                                                          714/E11.02
2013/0304571  A1*  11/2013  Swinson ............ G06Q 30/0277
                                                          705/14.54
2015/0286928  A1*  10/2015  Demiralp ................. G06N 5/02
                                                          706/61
2016/0180248  A1*   6/2016  Regan ..................... G09B 5/00
                                                          706/12
2017/0262770  A1*   9/2017  Purdy .................... G06N 20/20
2017/0364809  A1*  12/2017  Ramamurthi ........... G06F 17/18
2020/0139539  A1*   5/2020  Hasunuma ............... G06N 3/08
2020/0210856  A1*   7/2020  Vengalayapalli Kichagari ...........
                                                          G06Q 40/03

* cited by examiner

FIG. 1C

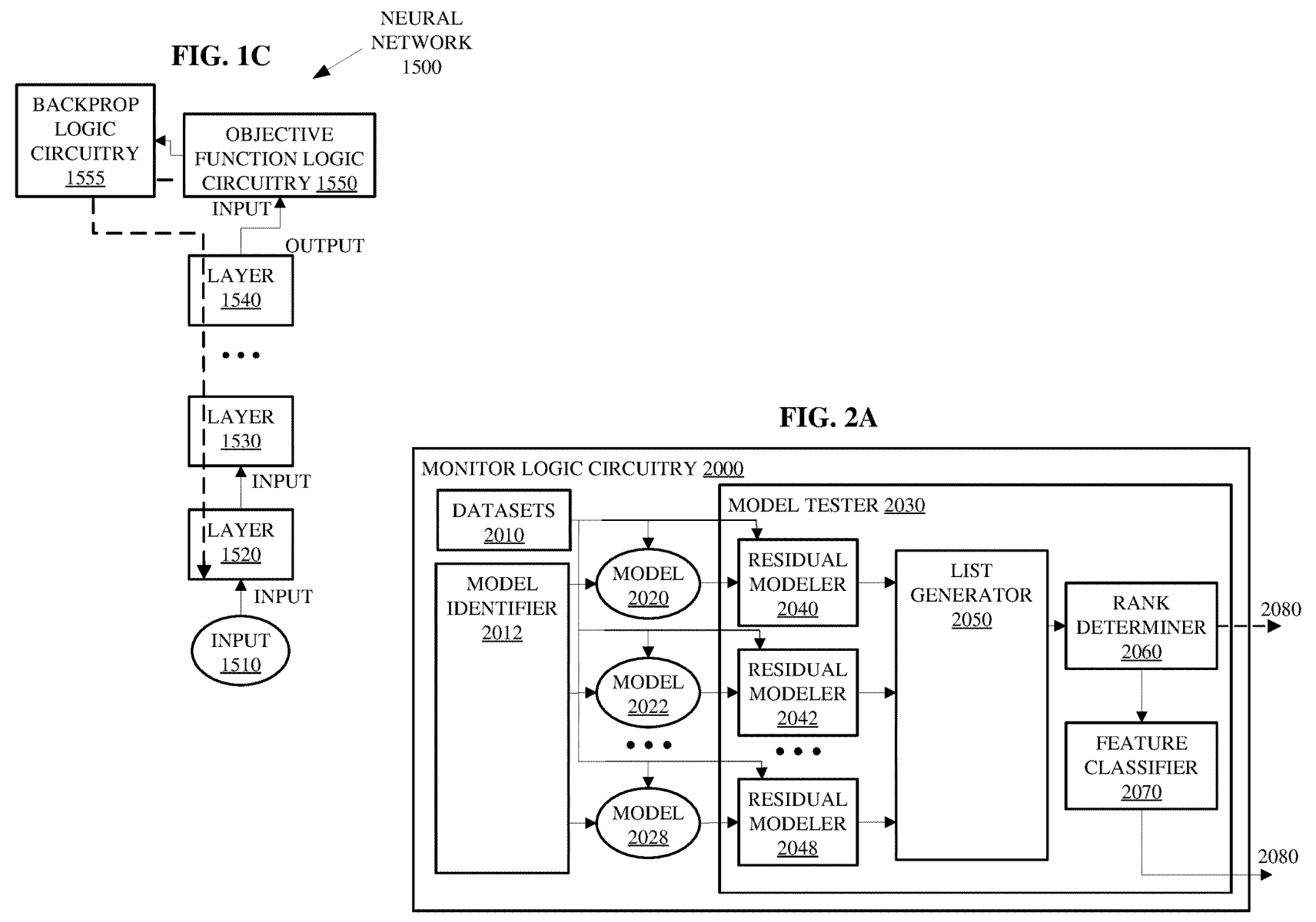

NEURAL NETWORK 1500

BACKPROP LOGIC CIRCUITRY 1555

OBJECTIVE FUNCTION LOGIC CIRCUITRY 1550

INPUT

OUTPUT

LAYER 1540

INPUT

LAYER 1530

INPUT

LAYER 1520

INPUT

INPUT 1510

FIG. 2A

MONITOR LOGIC CIRCUITRY 2000

DATASETS 2010

MODEL IDENTIFIER 2012

MODEL 2020

MODEL 2022

MODEL 2028

MODEL TESTER 2030

RESIDUAL MODELER 2040

RESIDUAL MODELER 2042

RESIDUAL MODELER 2048

LIST GENERATOR 2050

RANK DETERMINER 2060

FEATURE CLASSIFIER 2070

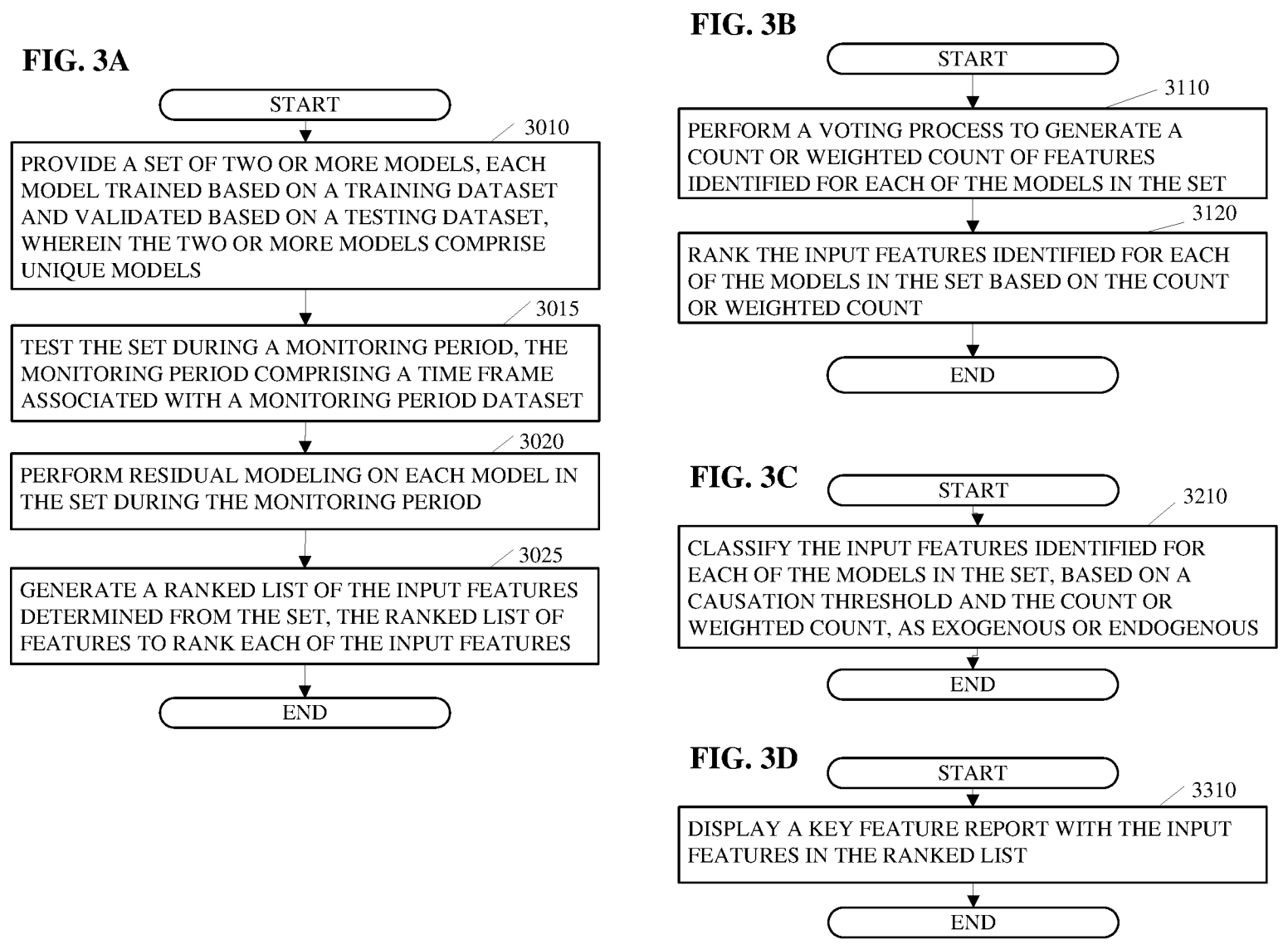

START

PROVIDE A SET OF TWO OR MORE MODELS, EACH MODEL TRAINED BASED ON A TRAINING DATASET AND VALIDATED BASED ON A TESTING DATASET, WHEREIN THE TWO OR MORE MODELS COMPRISE UNIQUE MODELS — 3010

TEST THE SET DURING A MONITORING PERIOD, THE MONITORING PERIOD COMPRISING A TIME FRAME ASSOCIATED WITH A MONITORING PERIOD DATASET — 3015

PERFORM RESIDUAL MODELING ON EACH MODEL IN THE SET DURING THE MONITORING PERIOD — 3020

GENERATE A RANKED LIST OF THE INPUT FEATURES DETERMINED FROM THE SET, THE RANKED LIST OF FEATURES TO RANK EACH OF THE INPUT FEATURES — 3025

END

FIG. 3B

START

PERFORM A VOTING PROCESS TO GENERATE A COUNT OR WEIGHTED COUNT OF FEATURES IDENTIFIED FOR EACH OF THE MODELS IN THE SET — 3110

RANK THE INPUT FEATURES IDENTIFIED FOR EACH OF THE MODELS IN THE SET BASED ON THE COUNT OR WEIGHTED COUNT — 3120

END

FIG. 3C

START

CLASSIFY THE INPUT FEATURES IDENTIFIED FOR EACH OF THE MODELS IN THE SET, BASED ON A CAUSATION THRESHOLD AND THE COUNT OR WEIGHTED COUNT, AS EXOGENOUS OR ENDOGENOUS — 3210

END

FIG. 3D

START

DISPLAY A KEY FEATURE REPORT WITH THE INPUT FEATURES IN THE RANKED LIST — 3310

END

FIG. 3E

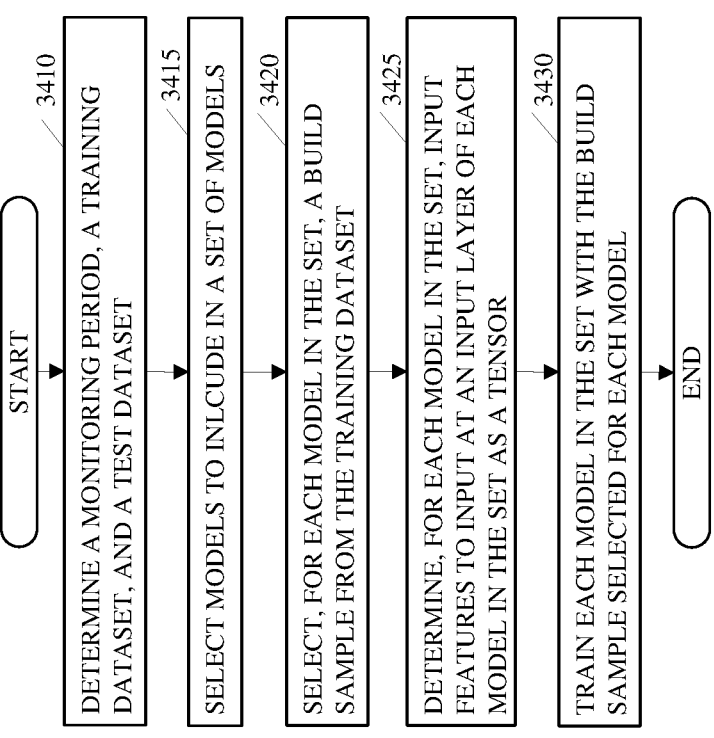

START

3410

DETERMINE A MONITORING PERIOD, A TRAINING DATASET, AND A TEST DATASET

3415

SELECT MODELS TO INLCUDE IN A SET OF MODELS

3420

SELECT, FOR EACH MODEL IN THE SET, A BUILD SAMPLE FROM THE TRAINING DATASET

3425

DETERMINE, FOR EACH MODEL IN THE SET, INPUT FEATURES TO INPUT AT AN INPUT LAYER OF EACH MODEL IN THE SET AS A TENSOR

3430

TRAIN EACH MODEL IN THE SET WITH THE BUILD SAMPLE SELECTED FOR EACH MODEL

END

FIG. 4

STORAGE MEDIUM 5000

COMPUTER EXECUTABLE INSTRUCTIONS FOR 5000

COMPUTING PLATFORM 6000

PROCESSING COMPONENT 6010

APPARATUS 6015

STORAGE MEDIUM 6020

OTHER PLATFORM COMPONENTS 6025

COMMUNICATIONS INTERFACE 6030

METHODS AND ARRANGEMENTS TO IDENTIFY FEATURE CONTRIBUTIONS TO ERRONEOUS PREDICTIONS

CROSS-REFERENCE TO RELATED APPLICATIONS

This application is a continuation of U.S. patent Application No. 17,521,548, entitled "METHODS AND ARRANGEMENTS TO IDENTIFY FEATURE CONTRIBUTIONS TO ERRONEOUS PREDICTIONS" filed Nov. 8, 2021 and U.S. patent application Ser. No. 16/229,934, entitled "METHODS AND ARRANGEMENTS TO IDENTIFY FEATURE CONTRIBUTIONS TO ERRONEOUS PREDICTIONS" filed on Dec. 21, 2018, now U.S. Pat. No. 11,200,461. The contents of the aforementioned application are incorporated herein by reference in their entirety.

TECHNICAL FIELD

Embodiments described herein are in the field of error analysis in predictive models. More particularly, the embodiments relate to methods and arrangements to identify feature contributions to erroneous predictions.

BACKGROUND

Predictive modeling uses statistics to predict outcomes. Most often the event one wants to predict is in the future, but predictive modeling can be applied to any type of unknown event, regardless of when it occurred. For example, predictive models can predict a future event such a probability related to a customer's credit worthiness, or can predict whether a credit card transaction, which has already occurred, is a fraudulent transaction.

Numerous statistics might affect the predictions so model developers typically select input features for the models and, in machine learning cases, allow the models to develop weighting and biasing to adjust how each input feature affects the models' predictions. Input features may include raw data such as events in time line or derived events that may include calculations from other models.

Over time, predictive models tend to break down. When a model is "breaking down", the phrase "breaking down" refers to an increasing error or residual between the predicted results and expected results. Many respond to such break downs by replacing the predictive models with new predictive models.

SUMMARY

Embodiments may include various different types of subject matter such as methods, apparatuses, systems, storage media, and/or the like. One embodiment may include an apparatus comprising: memory; and logic circuitry coupled with the memory. In some embodiments, the logic circuitry may provide a set of two or more models, each model trained based on a training dataset and validated based on a testing dataset. The two or more models may comprise unique models. The logic circuitry may test the set during a monitoring period and the monitoring period may comprise a time frame associated with a monitoring period dataset. The logic circuitry may perform residual modeling on each model in the set during the monitoring period, to determine a list of input features that contribute to a residual for each model of the set to two or more models. The residual may comprise a difference between a result predicted by each model and an expected result. And the logic circuitry may generate a ranked list of the input features determined from the set, the ranked list of the input features to associate a rank with each of the input features.

Another embodiment may comprise a non-transitory storage medium containing instructions, which when executed by a processor, cause the processor to perform operations. The operations may identify a set of models comprising two or more unique models to test during a monitoring period based on a monitoring period dataset, the set of models to train based on a training dataset and train each model in the set based on the training dataset. The operations may also perform residual modeling on each model in the set during a monitoring period, the residual modeling to identify input features that contribute to a residual. The residual is a difference between an expected result and a result predicted by each of the models. And the operations may determine a combined list of the input features for the set.

Yet another embodiment may comprise a system. The system may comprise memory and logic circuitry coupled with the memory. The logic circuitry may determine a monitoring period, a training dataset, and a test dataset based on a transaction dataset, wherein the training dataset and the test dataset include multiple data types, and select models to include in a set of models. The logic circuitry may also select, for each model in the set, a build sample from the training dataset, wherein the build sample comprises a selected subset of the training dataset. In some embodiments, the logic circuitry may determine, for each model in the set, input features to input at an input layer of each model as a tensor, wherein the input features comprise a portion of or all the multiple data types in the training dataset, and train each model in the set with the build sample selected for each model.

BRIEF DESCRIPTION OF THE DRAWINGS

FIG. 1C depicts an embodiment of a neural network of a model, such as the models in illustrated in FIG. 1A-FIG. 1B;

FIGS. 2A-B depict embodiments of monitor logic circuitry, such as the monitor logic circuitry shown in FIG. 1A-FIG. 1B;

FIGS. 3A-E depict flowcharts of embodiments to identify feature contributions to erroneous predictions, by monitor logic circuitry, such as the monitor logic circuitry shown in FIG. 1A-FIG. 1B;

FIG. 4 depicts an embodiment of a system including a multiple-processor platform, a chipset, buses, and accessories such as the server shown in FIGS. 1A-1B.

DETAILED DESCRIPTION OF EMBODIMENTS

Figures 1A, 1B:
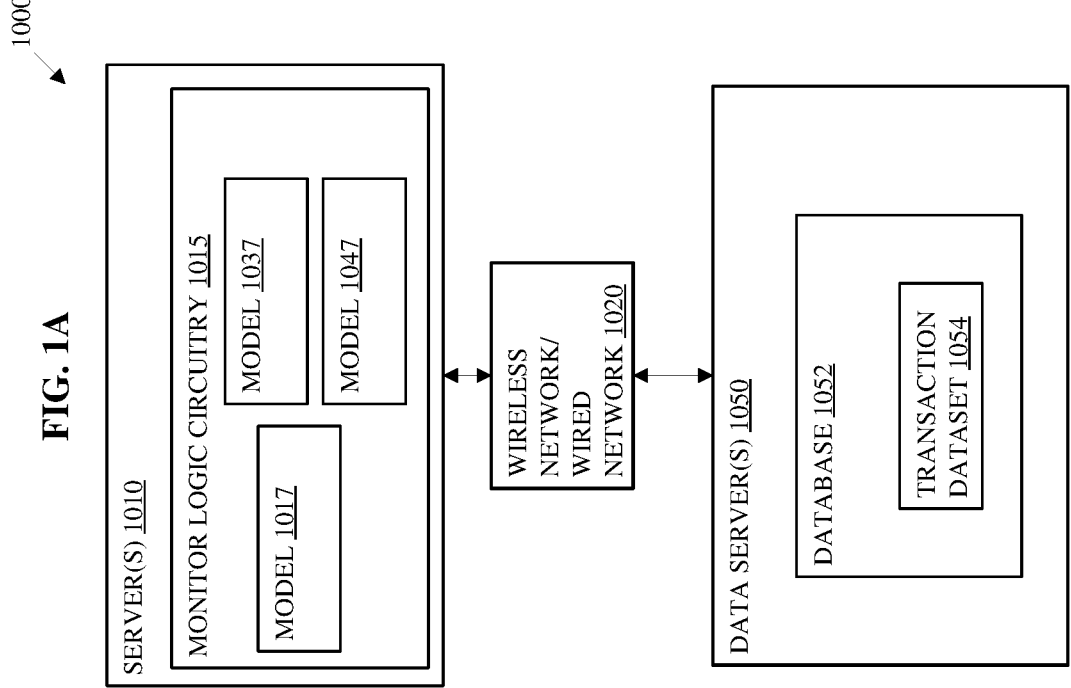
FIGS. 1A-1B depict embodiments of systems including servers, networks, and data servers to identify feature contributions to erroneous predictions.

The following is a detailed description of embodiments depicted in the drawings. The detailed description covers all modifications, equivalents, and alternatives falling within the appended claims.

Predictive models tend to break down for various reasons. In general, predictive models break down as a result of endogenous or exogenous features. Endogenous features refer to features of the model that indicate changes that are inherently related to the model and/or limitations related to the training of the model. Exogenous features refer to features related to the broader changes in the environment about the model. For example, endogenous features may relate to, e.g., selected datasets used to train a predictive model, the methodology of the predictive model, and/or the input features selected for the predictive model. The exogenous features may relate to, e.g., a global or local economic downturn that changes a trend learned by the predictive model in a way that could not be anticipated by a model based on the data that was available to train the model.

To illustrate further, a predictive model for predicting purchasing trends may train with transaction data selected from a transaction dataset covering the last 10 years. If the predictive model has operated over the last 5 years based on training data from 8 years ago, the purchasing trend from 8 years ago may not accurately reflect purchasing trends today. During training, the predictive model may have accurately learned purchasing trends from the transaction dataset from 8 years ago but predictions based on those trends may no longer reflect a current purchasing trend and, thus, will become increasingly more erroneous, based on exogenous features, as the purchasing trends changed over the last 5 years. On the other hand, if the purchasing trends continue to accurately depict the current purchasing trends but the hyperparameters associated with the model, the methodology of the model, or the input features selected for the model prevent the model from accurately learning the trends from the transaction dataset, the predictive model may break down as a result of endogenous features.

Predictive models employed in the financial industries can be subject to regulations. The regulations can present difficulties and disincentives in relation to replacing some predictive models. As a result, financial industries may perform corrections external to the predictive models to repair the predictive models.

Note that embodiments herein describe use of transaction data from a transaction dataset and many examples indicate that the transaction data may include information from the three credit bureaus, Equifax, TransUnion®, and Experian; information from a loan or credit card application; information about the process by which a consumer submitted an application for a loan or credit card; information about a browser and/or computer from which the consumer filled out the application; information about credit card transactions; and/or other information related to credit histories, credit worthiness, fraudulent transactions, and/or the like. However, these are only examples and the embodiments are not so limited. Transaction data can be any type of data that is collected over time and includes trends that a model can learn through training for the purposes of determining a prediction or classification.

Embodiments herein may monitor predictive models to identify features that contribute to residuals related to the results output by the predictive models with a process referred to as "ensemble monitoring". Identification of features that contribute to the residuals can describe key features associated with the breakdown of models. The description of the key features associated with the breakdown of models may facilitate creation of a new model that accounts for these key features and/or identify features to target with corrective measures to improve or repair existing models.

Many embodiments create or identify a set of two or more models, each model trained based on the same training dataset and tested based on the same testing dataset to output the same predictions. The models may comprise two or more or all unique models. The uniqueness of the models can, in some embodiments, facilitate identification of model attributes that relate to the residuals of the set of models. The models may be unique based on model attributes such as the model methodology, key parameters, build sample, and/or input features.

In some embodiments, creation or identification of a set of models may involve copying a set of predictive models from a library of predictive models into memory of, e.g., a server, to perform testing. Selection or identification of the models to copy from the model library may involve random or pseudorandom selection of models from the library, a default selection of the models from the library, a schedule of model selections for testing, and/or selection of some of or all the models through interaction with a user. Furthermore, selection or identification of the models to copy from the model library may be based on the methodologies of the models, hyperparameters of the models, the set of input features associated with the input of the models, and, in some embodiments, the build sample(s) associated with the models.

The model methodology relates to the model type implemented such as a linear model, a non-linear model, and a deep learning model. A linear model may make predictions based on a linear function of the input features. A non-linear model may make predictions based on a non-linear function of the input features such as a decision tree type of model.

A deep learning model comprises a cascade of multiple layers of nonlinear processing units for feature extraction and transformation. Each successive layer uses the output from the previous layer as input, learn in supervised (e.g., classification) and/or unsupervised (e.g., pattern analysis) manners, and learn multiple levels of representations that correspond to different levels of abstraction to form a hierarchy of concepts.

Each model in the set of models trains based on the same training set and testing set. However, each model may train with a subset of or all the data in the training set and the testing set. For instance, the training and testing data sets may include 15 years of historical transaction data. Rather than training and testing with data over a period of 15 years, each model may be trained with one or more time periods of data from the transaction dataset. The one or more time periods are referred to as the build sample for the model. Several embodiments select the one or more time periods as subsets of one or more, e.g., years of the transaction dataset to train and validate a model. In some embodiments, the build sample for each model may include a first time period that is many years in the past such as a decade or two and a second time period that is in the recent past such as within the last few years. Furthermore, each model may receive, as input data, one or more different sets of input features. The input features may include a subset of or all the statistics or data types from the training and testing sets.

After training and validating each of the models in the set of models, embodiments may test the set of models during a monitoring period with a monitoring period dataset. In many embodiments, the monitoring period dataset may comprise a subset from the transaction dataset over a time period, referred to as the monitoring period, that is not included in the training and testing datasets.

Several embodiments perform residual modeling on each model in the set during the monitoring period. Residuals are differences between the one-step predicted output from a model and the measured output, or expected output, from a dataset. In other words, the residual comprises a difference between a result predicted by a model and an "actual" result (hereinafter referred to as an expected result) that is measured or determined based on, e.g., the monitoring period dataset during the monitoring period. Thus, the residuals represent the portion of the dataset not explained by the model. Note that residuals are also calculated during training from the training dataset for the purpose of training the models and during testing from the testing dataset for the purpose of validating the training.

Residual modeling may use an input feature vector or tensor of a model and analyze the residuals with respect to each feature in the model over the monitoring period to determine a list of features that contribute to a residual of each model. Residual modeling may output a list of features that contribute to the residuals for each model as well an indication of the strength of each feature in the determination of the residuals. In many embodiments, the residual modeling may also output indicators related to the goodness of fit of each model such as the degrees of freedom and chi-squared distribution. Thereafter, such embodiments may generate a combined list of features from the set of models.

Further embodiments may rank the features in the combined list. In particular, each model may vote on features included in the combined list. The vote of each model may be in the form of inclusion of the input feature as a contributor to the residual of that model. Many embodiments determine the vote based on a count of the number of the models in the set of models for which a particular input feature is a contributor to a residual. The count can be a straight count or a weighted count. An example of a weighted count includes a count that is weighted based on the assessed accuracy of the corresponding model or a correlation value associated with an input feature listed as a contributor for a model. The assessed accuracy of the model may relate to the magnitudes of the residuals, the number of input features identified as contributors to the residual for a model, the degrees of freedom associated with a model, the chi-squared distribution associated with a model, a combination of one or more of these factors, and/or the like. The highest ranked feature, for example, may be the feature that contributed to the residual or error in the results output by the most models in the set of models.

Once the features are ranked, some embodiments may classify the features as endogenous or exogenous. Several embodiments set a threshold for the votes based on the number of models in the set and/or other factors. If the number of votes for a feature is above the threshold, the feature may be classified as exogenous, or based on environmental factors or factors external to the model. If the number of votes for a feature is below the threshold, the feature may be classified as endogenous, or based on individual model attributes or traits. Further embodiments may output a scale of the input features ranging from endogenous to exogenous.

The classification of the features may, advantageously, help in understanding the type of transformation that can be applied to the features and how the features can be engineered to improve the predictions by predictive models.

Several embodiments comprise systems with multiple processor cores such as central servers, modems, routers, switches, servers, workstations, netbooks, mobile devices (Laptop, Smart Phone, Tablet, and the like), and the like. In various embodiments, these systems relate to specific applications such as healthcare, home, commercial office and retail, security, and industrial automation and monitoring applications, financial services, as well as vehicle applications (automobiles, self-driving vehicles, airplanes, drones, and the like), and the like.

Turning now to the drawings, FIG. 1A-1B depict embodiments of systems including servers, networks, and data servers to identify feature contributions to erroneous predictions. FIG. 1A illustrates an embodiment of a system 1000. The system 1000 may represent a portion of at least one wireless or wired network 1020 that interconnects server(s) 1010 with data server(s) 1050. The at least one wireless or wired network 1020 may represent any type of network or communications medium that can interconnect the server(s) 1010 and the data server(s) 1050, such as a cellular service, a cellular data service, satellite service, other wireless communication networks, fiber optic services, other land-based services, and/or the like, along with supporting equipment such as hubs, routers, switches, amplifiers, and/or the like.

In the present embodiment, the server(s) 1010 may represent one or more servers owned and/or operated by a company that provides services. In some embodiments, the server(s) 1010 represent more than one company that provides services. For example, a first set of one or more server(s) 1010 may provide services including identifying features of a set of models 1017, 1037 and 1047 via monitor logic circuitry 1015. The models 1017, 1037 and 1047 may comprise part of or comprise the entirety of a set of M models selected or identified for ensemble monitoring by the monitor logic circuitry 1015. In many embodiments, the set of M models may include at least two unique models. In the present embodiments, the set of M models includes an entire set of unique models including the models 1017, 1037 and 1047.

The uniqueness of the models relates to differences in the methodology of the models, key parameters of the models, the input features of the models, and/or the build samples selected for training and testing the models. The models may comprise machine learning models such as neural networks or other machine learning models. The methodology of the models may refer to the model type such as a linear model, a non-linear model, and/or a deep learning model. An example of a linear model may be a logistic regression engine. An example of a non-linear model may be a gradient boosting engine. And an example of a deep learning model may be a deep learning neural network.

The key parameters of a model refer to hyperparameters of a machine learning model. Parameters of a model typically refer to parameters that the model can learn during training. Hyperparameters are parameters of the model that are set prior to training that relate to properties of the model such as the complexity of the model, how fast the model can learn, and/or the like. The types of the hyperparameters associated with the model depend on the methodology of the model. For instance, the hyperparameters may include the number of latent factors in a matrix factorization; the learning rate; the number of clusters in a k-means clustering; and the like. A tree-type non-linear model may have hyperparameters such as the number of leaves or depth of a tree; the number of trees; the subsample rate; the quorum sample or number of features per tree; and/or the like. Furthermore, a deep learning model may have hyperparameters such as the number of hidden layers in a deep neural network; the number of neurons per layer; the number of epochs performed for training; the batch size; and/or the like.

The models 1017, 1037, and 1047 have input features. The input features describe to data types that the models 1017, 1037, and 1047 receive as inputs in the form of tensors at an input layer of the models 1017, 1037, and 1047. The selection of a portion of the data types from the training and testing datasets can distinguish the models 1017, 1037, and 1047.

Furthermore, each model of the set of M models are trained or retrained based on build samples. The build samples define the portion of or the entirety of the training and testing datasets used to train and validate the models 1017, 1037, and 1047. For instance, the model 1017 may use the last three years of the training and testing data for training as well as the years 2000 through 2007. The other models 1037 and 1047 will be unique if the models 1037 and 1047 train with a different build sample, if the models 1037 and 1047 have different methodologies, if the models 1037 and 1047 have difference key features, and/or if the models 1037 and 1047 have different key parameters.

In several embodiments, the set of M models may include existing predictive models to retrain with the training and testing datasets. In some embodiments, the set of M models may include new predictive models to pretrain with the training and testing datasets. And, in many embodiments, the set of M models may include a combination of existing predictive models and new models.

The monitor logic circuitry 1015 may gather or have access to a training dataset and a testing dataset for the models 1017, 1037 and 1047 in the transaction dataset 1054 of the database 1052 on the data server(s) 1050. For instance, the monitor logic circuitry 1015 may retrieve part of or all the transaction dataset 1054 to store locally with the server(s) 1010 for use as training and testing dataset and designate portions of the transaction dataset 1054 for training data and portions of the transaction dataset 1054 for testing data. In some embodiments, the monitor logic circuitry 1015 may retrieve portions of the transaction dataset 1054 selected for model build samples and for a monitoring period. In further embodiments, the monitor logic circuitry 1015 may access the transaction dataset 1054 from the data server(s) 1050 as needed and may cache some of the transaction dataset 1054 locally.

The training dataset and testing dataset may include multiple years of the transaction dataset 1054. The content of the training dataset and testing dataset depends on the prediction made by the models 1017, 1037 and 1047. For instance, in some embodiments, the transaction data may include information from the three credit bureaus, Equifax, TransUnion®, and Experian; information from a loan or credit card application; information about the process by which a consumer submitted an application for a loan or credit card; information about a browser and/or computer from which the consumer filled out the application; information about credit card transactions; and/or other information related to credit histories, credit worthiness, fraudulent transactions, and/or the like.

In many embodiments, the monitor logic circuitry 1015 may pretrain and/or retrain the set of models 1017, 1037, and 1047 based on training and testing datasets; test the set of models 1017, 1037, and 1047 over a monitor period; perform residual modeling, or residual analysis, to identify features from each of the models 1017, 1037, and 1047 that contributed to the respective residuals; and generate lists of the input features that contributed to the residuals for each of the models 1017, 1037, and 1047. For example, the monitor logic circuitry 1015 may generate a list of input features for the model 1017 based on residual analysis of the residuals associated with the model 1017. The monitor logic circuitry 1015 may, similarly, generate a list for each additional model in the set of models such as a list for the model 1037 and a list for the model 1047.

The monitor logic circuitry 1015 may determine residuals output by the models 1017, 1037 and 1047 over a monitor period with a monitoring period dataset selected from the transaction dataset 1054. In some embodiments, the monitor logic circuitry 1015 may select the monitoring period from the transaction dataset 1054 prior to training the models so the models do not include transaction data from the monitoring period in a build sample. The monitoring period may include a testing data over, e.g., a recent time period to test the abilities of each of the models to output predicted results.

During the monitoring period, the monitor logic circuitry 1015 may perform residual modeling. The residual modeling may be an explanatory model that uses input feature tensors of the models 1017, 1037, and 1047 to analyze the residuals for each input feature of each of the models 1017, 1037, and 1047. For instance, the residual modeling may perform one or more tests to determine which input features contribute to the residuals of the models 1017, 1037, and 1047 such as autocorrelations of the residuals of a model responsive to successive tensors and cross-correlations of a residual from a model with successive tensors input at the input layer of the model.

In a good model, autocorrelation of the residuals may show that the residuals are uncorrelated. Furthermore, correlation of the residuals with current and past tensors of data for input features of a good model should show that the input features from the monitoring period data do not correlate with the residuals. Thus, correlation between a residual and current or past tensors of input data during the monitoring period may indicate that the model does not properly use an input feature and that the input feature should be included in the list of features that contribute to the residual for the model.

In many embodiments, the monitor logic circuitry 1015 may compare a correlation value that results from a correlation of a residual with an input feature to a correlation threshold. If the correlation value exceeds the correlation threshold or otherwise indicates that the correlation is higher than the correlation indicated by the correlation threshold, the monitor logic circuitry 1015 may determine that the input feature contributes to the residual. Furthermore, the correlation value may indicate a strength of correlation between the input feature and the residual for the model.

After and/or concurrently with the monitoring period, the monitor logic circuitry 1015 may generate an aggregated list of the input features associated with the models 1017, 1037, and 1047 that contribute to the residuals of the models 1017, 1037, and 1047. In many embodiments, the monitor logic circuitry 1015 may rank the input features in the list or create a ranked list of the input features. The monitor logic circuitry 1015 may rank the features via a voting process. The voting process relates to the number of the models 1017, 1037, and 1047 that list an input feature as a contributor to residuals for the corresponding model. In some embodiments, the monitor logic circuitry 1015 may determine the rank by counting the number of models that include the input feature as a contributor. In further embodiments, the count may be weighted. The count can be weighted by different methods. For instance, the monitor logic circuitry 1015 may weight the count based on an indicator of the strength of each feature in determining a residual such as a correlation value and/or based on an indicator based on the residual modeling of the models' ability to use input features in general such as the degrees of freedom and/or the chi-squared distribution.

After determining a rank for the input features, the monitoring logic circuitry 1015 may classify the input features based on the rank of each of the features. For instance, the monitor logic circuitry 1015 may classify the input features as exogenous or endogenous based on the rank of each input feature. In some embodiments, the monitor logic circuitry 1015 may classify each input feature as exogenous if the number of votes or rank for the input feature meets or exceeds a causation threshold and may classify each input feature as endogenous if the number of votes or rank for the input feature is less than a causation threshold. In one embodiment, the causation threshold may be 50%. In another embodiment, the causation threshold may be 80%. In a further embodiment, the causation threshold may be 20% and the causation threshold, in some embodiments, may vary based on other factors. In other embodiments, the classification of the input features may comprise a scale from exogenous to endogenous or from highly likely exogenous to highly likely endogenous based on the rank or based on the number of votes.

FIG. 1B depicts an embodiment for an apparatus 1100 such as one of the server(s) 1010 shown in FIG. 1A. The apparatus 1100 may be a computer in the form of a smart phone, a tablet, a notebook, a desktop computer, a workstation, or a server. The apparatus 1100 can combine with any suitable embodiment of the systems, devices, and methods disclosed herein. The apparatus 1100 can include processor(s) 1110, a non-transitory storage medium 1120, communication interface 1130, and a display device 1135. The processor(s) 1110 may comprise one or more processors, such as a programmable processor (e.g., a central processing unit (CPU)). The processor(s) 1110 may comprise processing circuitry to implement monitor logic circuitry 1115 such as the monitor logic circuitry 1015 in FIG. 1A.

The processor(s) 1110 may operatively couple with a non-transitory storage medium 1120. The non-transitory storage medium 1120 may store logic, code, and/or program instructions executable by the processor(s) 1110 for performing one or more instructions including the monitor logic circuitry 1125. The non-transitory storage medium 1120 may comprise one or more memory units (e.g., removable media or external storage such as a secure digital (SD) card, random-access memory (RAM), a flash drive, a hard drive, and/or the like). The memory units of the non-transitory storage medium 1120 can store logic, code and/or program instructions executable by the processor(s) 1110 to perform any suitable embodiment of the methods described herein. For example, the processor(s) 1110 may execute instructions such as instructions of monitor logic circuitry 1125 causing one or more processors of the processor(s) 1110 represented by the monitor logic circuitry 1115 to perform an inference computation, by a neural network such as the models 1017, 1037, and 1047 of the monitor logic circuitry 1115 based on transaction data such as the transaction dataset 1054 shown in FIG. 1A. The inference computation may analyze residuals from the neural network based on monitor period data during a monitoring period and generate a list of input features that contribute to the residuals. In some embodiments, the neural networks are pretrained or retrained with a training dataset and a testing dataset from the transaction data.

Once the residual modeling determines the list of input features that contribute the residuals of the neural network, the monitor logic circuitry 1115 may combine the list with lists generated for other neural networks or models to generate an aggregated list of the input features.

The monitor logic circuitry 1115 may determine how to rank the input features and then classify the input features based on the rank of each input feature as exogenous or endogenous to indicate whether the residuals result from a model's inability to appropriately use the input feature or the residual results from external or environmental factors.

In response to a determination that the list of input features and/or the classification of the input features, the monitor logic circuitry 1115 may cause a key feature report to display on a display device 1135. The key feature report may identify and/or explain critical variables (the input features) related to model underperformance (the residuals). The key feature report may include the list of input features, the ranked list of input features, and/or classifications of the input features. In some embodiments, the key feature report may include a classification of each feature in a list of the input features. In some embodiments, the key feature report may include a classification of each feature on a scale that ranges from exogenous to endogenous along with probabilities associated with the classifications. In further embodiments, the monitor logic circuitry 1115 may cause a key feature report to transmit to another device or server or to a printer.

The memory units may comprise shared memory to store inputs and outputs of layers of the neural network for computation of predicted results, by the processor(s) 1110. In some embodiments, the memory units of the non-transitory storage medium 1120 may store the processing results produced by the processor(s) 1110.

The processor(s) 1110 may couple to a communication interface 1130 to transmit and/or receive data from one or more external devices (e.g., a terminal, display device, a smart phone, a tablet, a server, a printer, or other remote device). The communication interface 1130 includes circuitry to transmit and receive communications through a wired and/or wireless media such as an Ethernet interface, a wireless fidelity (Wi-Fi) interface, a cellular data interface, and/or the like. In some embodiments, the communication interface 1130 may implement logic such as code in a baseband processor to interact with a physical layer device to transmit and receive wireless communications such as transaction data from a server or an instance of a neural network of the monitor logic circuitry 1115. For example, the communication interface 1130 may implement one or more of local area networks (LAN), wide area networks (WAN), infrared, radio, Wi-Fi, point-to-point (P2P) networks, telecommunication networks, cloud communication, and the like.

FIG. 1C depicts an embodiment of a neural network 1500 of a monitor logic circuitry, such as the models 1017, 1037, and 1047 and the monitor logic circuitry 1015 illustrated in FIG. 1A. FIG. 1C depicts an embodiment of stages of a neural network (NN) 1500 such as a deep neural network (DNN).

A DNN is a class of artificial neural network with a cascade of multiple layers that use the output from the previous layer as input. An example of a DNN is a recurrent neural network (RNN) where connections between nodes form a directed graph along a sequence. This allows the RNN to exhibit dynamic temporal behavior for a time sequence. A feedforward neural network is a neural network in which the output of each layer is the input of a subsequent layer in the neural network rather than having a recursive loop at each layer.

Another example of a DNN is a convolutional neural network (CNN). A CNN is a class of deep, feed-forward artificial neural networks. A CNN may comprise of an input layer and an output layer, as well as multiple hidden layers.

The hidden layers of a CNN typically consist of convolutional layers, pooling layers, fully connected layers, and normalization layers.

The NN 1500 comprises an input layer 1510, and three or more layers 1520 and 1530 through 1540. The input layer 1510 may comprise input data for input features that is training data for the NN 1500 or monitoring period data to evaluate. The input layer 1510 may provide the transaction data in the form of tensor data to the layer 1520. The transaction data may comprise various types of information related to finances of one or more customers such as credit bureau information, credit card or loan application information, browser information related to submission of the application, credit card transaction information, a combination of one or more types of information, and/or the like.

In many embodiments, the input layer 1510 is not modified by backpropagation. The layer 1520 may compute an output and pass the output to the layer 1530. Layer 1530 may determine an output based on the input from layer 1520 and pass the output to the next layer and so on until the layer 1540 receives the output of the second to last layer in the NN 1500. Depending on the methodology of the NN 1500, each layer may include input functions, activation functions, and/or other functions as well as weights and biases assigned to each of the input features. The weights and biases may be randomly selected or defined for the initial state of a new model and may be adjusted through training via backwards propagation (also referred to as backpropagation or backprop). When retraining a model, the weights and biases may have values related to previous training of the model and may be adjusted through retraining via backwards propagation.

The layer 1540 may generate an output and pass the output to an objective function logic circuitry 1550. The objective function logic circuitry 1550 may determine errors in the output from the layer 1540 based on an objective function such as a comparison of the predicted results against the expected results. For instance, the expected results may be paired with the input in the training data supplied for the NN 1500 for supervised training.

During the training mode, the objective function logic circuitry 1550 may output errors to backpropagation logic circuitry 1555 to backpropagate the errors through the NN 1500. For instance, the objective function logic circuitry 1550 may output the errors in the form of a gradient of the objective function with respect to the input features of the NN 1500.

The backpropagation logic circuitry 1555 may propagate the gradient of the objective function from the top-most layer, layer 1540, to the bottom-most layer, layer 1520 using the chain rule. The chain rule is a formula for computing the derivative of the composition of two or more functions. That is, if f and g are functions, then the chain rule expresses the derivative of their composition f∘g (the function which maps x to f(g(x))) in terms of the derivatives of f and g. After the objective function logic circuitry 1550 computes the errors, backpropagation logic circuitry 1555 backpropagates the errors. The backpropagation is illustrated with the dashed arrows.

When operating in inference mode such as during testing during the monitoring period, the monitor logic circuitry, such as the monitor logic circuitry 1115 shown in FIG. 1B, may repetitively capture a residual output from the objective function logic circuitry 1550 responsive to a tensor of input data associated with input features of the NN 1500.

FIG. 2A depicts an embodiment of a monitor logic circuitry 2000 such as the monitor logic circuitry 1015 in FIG. 1A. The monitor logic circuitry 2000 may perform one or more operations to test models 2020, 2022, through 2028, such as the models 1017, 1037, and 1047 illustrated in FIG. 1A, to identify feature contributions to erroneous predictions. The number of models may vary between tests and may be between 2 and 12 models, 2 and 24 models, or may include more models such as between 30 and 50 models.

The monitor logic circuitry 2000 may comprise datasets 2010 and logic circuitry such as the model identifier 2012, models 2020 through 2028, and a model tester 2030. The datasets 2010 may comprise training and testing datasets as well as one or more monitor period datasets.

The model identifier 2012 may identify or create the models 2020 through 2028 for testing. In some embodiments, the monitor logic circuitry 2000 may instantiate one or more of the models 2020 through 2028 from a library of models based on input features of the models from a list of input features provided by a user, provided with the datasets, or included in the datasets. For instance, the model identifier 2012 may randomly or pseudo randomly select models from a model library based on, e.g., model methodologies suggested by a user, models available in the model library, existing models, and/or the like. In other embodiments, model identifier 2012 may interact with a user to identify models in a model library to provide the models 2020 through 2028.

After identifying or otherwise providing the models 2020 through 2028 that are pretrained with the datasets 2010, the models 2020 through 2028 may process a monitoring period dataset. The monitoring period dataset may be a dataset identified for testing during a monitoring period that includes, e.g., the last 5 years of transaction data. The time frame and selection of the monitoring period may be selected based on various factors and some of the factors may be implementation specific.

The model tester 2030 may perform residual modeling based on the output from each of the models 2020 through 2028 and may output a key feature report to identify input features that contribute to the residuals of the models 2020 through 2028. The model tester 2030 comprises residual modelers 2040, 2042 through 2048; a list generator 2050; a rank determiner 2060; and a feature classifier 2070. The residual modelers 2040 through 2048 may receive data for input features to track the input data received at the input of each of the models 2020 through 2028. With the input data, the residual modelers 2040 through 2048 may correlate the input data related to the input features of each model with the residual from the model to detect a correlation, if any. In some embodiments, the residual modelers 2040 through 2048 may receive residuals output by the models 2020 through 2028, respectively, from objective function logic circuitry such as the objective function logic circuitry 1550 shown in FIG. 1C. In further embodiments, the residual modelers 2040 through 2048 may receive probabilities or predicted results output by the models 2020 through 2028, respectively, and determine residuals for each of the models 2020 through 2028.

Based on the input data and the residuals of each of the models 2020 through 2028, each of the residual modelers 2040 through 2048 may determine a list of input features that contribute to the residual for each of the models 2020 through 2028, respectively. In other words, the residual modeler 2040 may determine a list of input features of the model 2020 that contributed to the residual of the model 2020 during the monitoring period. Similarly, the residual modelers 2042 through 2048 may determine a list of input features of the models 2020 through 2028, respectively, that contributed to the residuals of the models 2020 through 2028, respectively, during the monitoring period.

In several embodiments, the residual modelers 2040 through 2048 may determine the list of input features by selecting input features that correlate with the residual of each model with a correlation value that meets or exceeds a correlation threshold. In other words, based of correlation calculations for, e.g., the model 2020, and the residual for the model 2020, the residual modeler 2040 may determine a correlation value between, e.g., between zero and one, to indicate a correlation of between 0% and 100%. In such embodiments, correlation threshold may comprise a value between zero and one such as 0.5 to indicate that a 50% correlation between the input feature and the residual is sufficiently strong to include the input feature on the list of input features that contributed to the residual for the model 2020. Note that the selection of the correlation threshold may be implementation specific and/or may depend on the correlation sensitivity associated with a particular key feature report 2080.

The list generator 2050 may generate a combined or aggregated list of the input features output by the residual modelers 2042 through 2048. In several embodiments, the residual modelers 2042 through 2048 my output and the list generator 2050 may build a list including one or more indicators for each of the input features and possibly indicators for each of the models 2020 through 2028. For example, the residual modelers 2042 through 2048 may output indications related to correlations between the input features of each of the models 2020 through 2028 to indicate how well the model processes the input data for each of the input features. In some embodiments, the residual modelers 2042 through 2048 may output an indicator for each of the models 2020 through 2028 to indicate the overall performance of each of the models 2020 through 2028 such as the degrees of freedom and the chi-squared distribution.

After aggregating or combining the input features that contribute to the residuals of the models 2020 through 2028, the rank generator 2060 may determine a rank for each of the input features in the aggregated list and associate the rank for each of the input features with the input features in the aggregated list.

In some embodiments, the rank generator 2060 may determine a rank for each of the input features based on a voting process. The voting process may count the number of the models 2020 through 2028 that included each of the input features in a list. In other embodiments, the rank generator 2060 may determine a weighted count of each of the features based on one or more of the indications included in the aggregated list by the list generator 2050. For instance, the rank generator 2060 may weight the ranking of the input features included in the list based on an indication of the number of input features included in the lists of each of the models 2020 through 2028. The number of input features in a list provide an indication of how well the model is able to process the input features.

In some embodiments, the rank determiner 2060 may output a key feature report 2080 that is a list of input features that contribute to the residuals of the models 2020 through 2028 with rankings for each of the features. In several embodiments, the feature classifier 2070 may classify each of the input features in the key feature report 2080 prior to outputting the key feature report 2080. For instance, the feature classifier 2070 may compare the rank of each of the input features with a causation threshold and associate each input feature in the key feature report 2080 with exogenous or endogenous. The input features with a rank that is higher than the causation threshold may be classified as exogenous and the input features with a rank lower than the causation threshold may be classified as endogenous. The causation threshold may be between 20% and 80% depending on factors such as the overall performance of the models, the strength of each feature in determining the residual for one or more of the models 2020 through 2028, and/or the like.

In other embodiments, the key feature report 2080 may include a scale of the input features sorted by the rank of each input feature. The scale may range from exogenous to endogenous or may range from likely exogenous to likely endogenous. In several embodiments, the scale may comprise ranges of probabilities that input feature is exogenous and/or endogenous and the probabilities may be based on, related to, proportional with, or inversely proportional with the rank. Once the feature classifier 2070 determines the classifications, the feature classifier 2070 may output the key feature report 2080 with the list of input features that associates a classification with the input features.

Figure 2B:
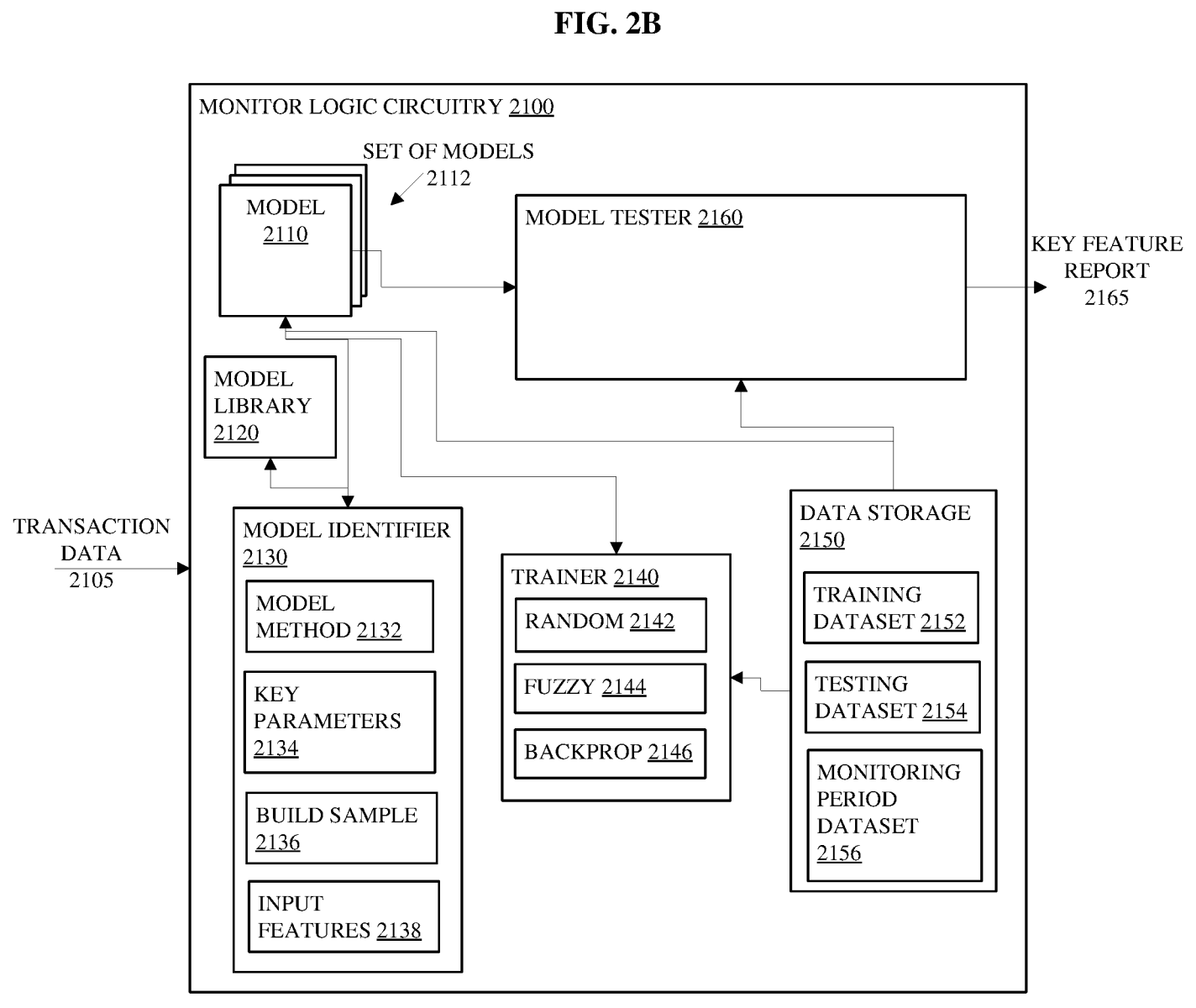

FIG. 2B depicts an embodiment of a monitor logic circuitry 2100 such as the monitor logic circuitry 1015 in FIG. 1A and/or 2000 in FIG. 2A. The monitor logic circuitry 2100 may perform one or more operations to identify or create a set of models 2112, such as the models 1017, 1037, and 1047 shown in FIG. 1A and the models 2020 through 2028 in FIG. 2A, to identify feature contributions to erroneous predictions. The monitor logic circuitry 2100 may comprise logic circuitry such as a model 2110 of the set of models 2112, a model library 2120, a model identifier 2130, a trainer 2140, a data storage 2150, and a model tester 2160. The set of models 2110 may comprise one or more recurrent neural networks, gradient boosting engines, logistic regression engines, and/or the like, to identify feature contributions to erroneous predictions output by the set of models 2112 during a monitoring period. In some embodiments, the set of models 2112 may comprise one or more existing models, such as the NN 1500 shown in FIG. 1C, to retrain prior to testing with input data of the monitoring period dataset 2156.

The model library 2120 may comprise one or more models that are preconfigured. The model library 2120 may comprise untrained models and may also contain existing models. In some embodiments, the model library 2120 includes models built based on different methodologies, different key parameters or hyperparameters, and/or different input features. In some embodiments, the model library 2120 may comprise models pretrained or retrained for testing with the model tester 2160.

The model identifier 2130 may select or identify models from the model library 2120 for testing with the model tester 2160. In some embodiments, the model identifier 2130 may interact with a user to identify models from the model library 2120, select the models identified, and create copies of the selected models for testing. In some embodiments, the model identifier 2130 may identify models from the model library 2120 based on criteria provided for selection of the models. The criteria may comprise user input, results from one or more previous tests performed by the model tester 2160, previously tested configurations of models, a schedule of variations of the models to test, and/or the like. For instance, the model identifier 2130 may identify new (untrained) models based on a model method 2132, key parameters 2134, and input features 2138. The model identifier 2130 may also, or alternatively, identify pretrained or retrained models based on a model method 2132, key parameters 2134, build sample 2136, and input features 2138. In one embodiment, the model identifier 2130 may select one or more existing models and identify one or more new models in the model library 2120 to train based on differences between the new models in the model library 2120 and the one or more existing models.

The model method 2132 may include a list of different model methodologies such as linear, non-linear, and deep learning and associate each methodology with one or more models in the model library 2120. The key parameters 2134 may include a list of hyperparameters in the models of the model library 2120.

The build sample 2136 may include indicators of build samples of pretrained or retrained models in the model library 2120 and/or build samples to select for pretraining or retraining models. For instance, in some embodiments, the model identifier 2130 may select a model from the model library 2120 that is pretrained based on the build sample indicated in the build sample 2136. In further embodiments, the model identifier 2130 may select a build sample for pretraining or retraining modes from the model library 2120.

The input features 2138 may include a list of data types in the transaction data 2105. The model identifier 2130 may interact with a user to select a model from the model library 2120 based on input features associated with the model. In some embodiments, the model identifier 2130 may randomly or pseudo randomly identify a model based on input features of the model, based on input features identified by a user, and/or based on input features associated with a testing schedule, and/or input features associated with models previously tested.

The monitor logic circuitry 2100 may receive the transaction data 2105 from a database or other data storage; may associate portions of the transaction data with a training dataset 2152, a testing dataset 2154, and a monitoring period dataset 2156; and may store the transaction data in the data storage 2150. In some embodiments, the data storage 2150 may cache portions of the transaction data 2105 for use during testing with the model tester 2160.

The trainer 2140 may pretrain new models or retrain existing models identified for inclusion in the set of models 2112 if these models were not pretrained or retrained prior to inclusion in the model library 2120. Prior to operation in inference mode, the monitor logic circuitry 2100 may operate the models in the set of models 2112 such as model 2110 in training mode and train the model 2110 with training dataset 2152 from the data storage 2150. The model 2110 may switch to inference mode for validation with the testing dataset 2154 to determine if the model 2110 is trained. For instance, the testing dataset 2154 may comprise data from the same time frame as the training dataset 2152 so the model 2110 may be considered trained once the model 2110 can converge on accurate and/or consistent predicted results based on the testing dataset 2154.

The trainer 2140 may repeatedly select sets of transaction data from the training dataset 2152 for training based on the build sample(s) selected for the model 2110. Each set of transaction data may include a sequence or time series of transaction data from, e.g., a randomly selected customer and the sets may have different counts or numbers of transactions to, advantageously, increase the robustness of the training. For instance, the sequence or time series of transaction data may include a time series of sets of customer data on a credit bureau report over a period of time such as loan originations and payment histories for the loans, credit card balances and payment histories for the credit cards, and the like.

The trainer 2140 comprises logic circuitry to improve the training by occasionally or periodically modifying the transaction data from the data storage 2150. In the present embodiment, the trainer 2140 comprises random 2142 and fuzzy 2144 logic circuitry. The random 2142 logic circuitry may form random sets of transactions from the training dataset 2152.

The trainer 2140 may also comprise fuzzy 2144 logic circuitry. The fuzzy 2144 logic circuitry may modify values of input features from the transaction data in the data storage 2150. For instance, the fuzzy 2144 logic circuitry may make small changes to values of transactions such as increasing or decreasing the value by 10% to 20%, modifying the time of the transaction, modifying the day of the transaction, and/or the like. Slight modifications to values of input features can, advantageously, improve the robustness of the training of the model 2110. In several embodiments, the fuzzy 2144 logic circuitry may modify values occasionally or periodically. For instance, some embodiments may modify one value of one percent of the transactions received from the data storage 2150. Other embodiments may modify multiple values in five percent of the transactions.

A backprop 2146 logic circuitry of the trainer 2140 may train the model 2110 by backward propagation of the error (or residual) that is output by the model 2110 in response to the training data. Backward propagation of the error may adjust weights and biases in the layers of the model 2110 to reduce the error. The backward propagation of the error may effectively adjust the range of predicted transactions responsive to the transaction data that caused the model 2110 to output the error.

The data storage 2150 may include training dataset 2152, testing dataset 2154, and monitoring period dataset 2156. The training dataset 2152 may include transaction data from multiple customers. In some embodiments, the training dataset 2152 is anonymized and/or at least a portion of the data is encrypted. The anonymized data may include transaction data that does not have data to identify a customer and may even have modified transaction data that does not accurately indicate the transactions by the customer but reflect the transactions closely enough for training the model 2110.

After the models in the set of models 2112 are trained or retrained with the training dataset 2152 and validated with the testing dataset 2154, the model tester 2160 may test the set of models 2112 in inference mode. The model tester 2160 may perform residual modeling on each model in the set during a monitoring period with the monitoring period dataset 2156. The monitoring period may be a period of time selected from the transaction data 2105 for performance of the residual modeling.

The residual modeling may identify features that contribute to a residual for each of the models in the set of models 2112. The residual is a difference between an expected result and a predicted result output by each of the models. For instance, each model in the set of models may receive or retrieve a portion of or all the monitoring period dataset 2156 and process tensors from the monitoring period dataset 2156. In several embodiments, the set of models 2112 may process multiple tensors from the beginning of the time period associated with the monitoring period dataset 2156 to the end of the time period associated with the monitoring period dataset 2156 as a time series.

The model tester 2160 may receive residuals from each of the models as well as input data from the monitoring period dataset 2156. The model tester 2160 may determine, based at least in part on correlations of the residuals against the input data, which input features in each of the models contribute to the residuals of the respective models. After determining lists of input features for each of the models, the model tester 2160 may create a key feature report 2165 to output that includes the input features identified for each of the models in the set of models 2112 and ranks each of the input features.

FIGS. 3A-E depict flowcharts of embodiments to identify feature contributions to erroneous predictions, by monitor logic circuitry, such as the monitor logic circuitry shown in FIGS. 1A-1B and FIGS. 2A-B. FIG. 3A illustrates a flowchart to generate a ranked list of input features based on residual modeling of a set of models. The flowchart starts with providing a set of two or more models, each model trained based on a training dataset and validated based on a testing dataset, wherein the two or more models comprise unique models (element 3010). In some embodiments, the models have been created and included in a library to facilitate testing. In some embodiments, pretrained models are included in the model library so that model testing can begin by identification or selection of a set of models to run the testing. In some embodiments, the models are not pretrained or retrained and, thus, can facilitate creation of multiple unique models by, e.g., training the same model with different the build samples, training models of different methodologies with the same build sample, training models having different input features with the same build sample, training models having different key parameters or hyper-parameters with the same build sample, and/or the like.

After providing a set of two or more models, the flowchart may proceed to test the set of models during a monitoring period, the monitoring period comprising a time frame associated with a monitoring period dataset (element 3015). In several embodiments, the monitor logic circuitry may begin to input monitoring period data into each of the models in the set in the form of, e.g., tensors. The tensors for each model may differ if the models have different input features. In response to the input of each tensor, each model in the set of models may generate a probability as an output and compare the probability against an expected result to determine a residual.

With the residual and the input data, the model tester may perform residual modeling on each model in the set during the monitoring period, to determine a list of input features that contribute to a residual for each model of the set (element 3020). In several embodiments, the model tester may perform, e.g., autocorrelations of the residuals to determine if the residuals of a model correlate with one another. In some embodiments, the model tester may correlate residuals of one model with the residuals of other models. And, in many embodiments, the model tester may correlate residuals with recent and prior input data or feature vectors to determine a correlation between input features of a model and the residuals of the same model. The model tester may correlate a residual with prior input data to detect a lag in the correlation.

After or concurrently with creation of a list of input features that contribute to a residual of each model, the monitor logic circuitry may combine or aggregate the lists of each of the models into a single list that includes all the input features that contribute the residuals of the set of models and rank the input features in the list (element 3025). Generation of the ranked list may comprise more than one action or may be combined into a single action. In some embodiments, the model tester may determine a count and/or weighted count as the model tester combines the list of input features for each model. For instance, the model tester may copy each input feature from a list for a first model into the ranked list and include a count of 1 and/or a weighted count based on a weight associated with the first model. For the second list from the second model in the set, the model tester may increment the count for repetitive input features and/or add the weighted count for the repetitive input features. This can repeat until all the lists from the models in the set are combined into the ranked list. In further embodiments, the model tester may output the ranked list to a display, printer, or file, and/or may transmit the ranked list to a remote server or computer as a key feature report.

FIG. 3B illustrates a flowchart for determining a rank for each feature in a combined list of input features that contribute to residuals of a set of models. The flowchart begins with performing a voting process to generate the combined list of input features from the set, the voting process to comprise a count or weighted count of input features identified for each of the models in the set (element 3110). In some embodiments, the monitor logic circuitry may perform a count of the number of lists output by the set of models that include the same input feature. The count may be a straight count or a weighted count.

After determining the count or weighted count, the monitor logic circuitry may rank the input features identified for each of the models in the set based on the count or weighted count (element 3120). In some embodiments, ranking the input features may involve associating a rank with each input feature. In further embodiments, the monitor logic circuitry may rank the input features by sorting the input features in an order based on a count or weighted count. In several embodiments, the monitor logic circuitry associated a rank with each input feature and sort the input features based on the rank. For embodiments that include more than one rank such as a count and one or more weighted counts, the monitor logic circuitry may include primary and secondary sorts or primary, secondary, and tertiary sorts based on the multiple ranks. Furthermore, the monitor logic circuitry may output more than one ranked list in the key feature report that includes various sorts based on the multiple ranks.

FIG. 3C illustrates a flowchart for classifying input features that contribute to residuals of a set of models. The flowchart begins with classifying input features identified for each of the models in the set, based on a causation threshold and the count or weighted count, as exogenous or endogenous (element 3210). Features with the highest number of votes or highest rank are most likely to be due to changes in the underlying environment being modeled and features with the lowest number of votes or lowest rank are likely due to individual model traits. Endogenous input features describe features with the lowest number of votes or lowest rank. Endogenous features are the features with the lowest rank because the model or models that list the input feature do not correctly process the data associated with the input feature, which creates the correlation between the input feature and the model or models.

Exogenous features are the features with the highest rank because multiple models in the set of models did not process the data associated with the input feature appropriately. Exogenous features are most likely to be due to changes in the underlying environment.

FIG. 3D illustrates a flowchart for displaying a key feature report. In response to determining a ranked list of input features that contribute to residuals of a set of models, the monitor logic circuitry may display a key feature report with the input features in the ranked list (element 3310). For instance, the monitor logic circuitry may communicate the key feature report to a display driver for a local display device or may communicate the key feature report to a remote display or remote computer to display.

FIG. 3E illustrates a flowchart for identifying or providing a set of models to test. The flowchart begins with determining a monitoring period, a training dataset, and a test dataset based on a transaction dataset, wherein the training dataset and the test dataset include multiple data types (element 3410). In many embodiments, the monitor logic circuitry may receive or retrieve transaction data, in entirety or as needed, from a data server for training and testing. The monitor logic circuitry may identify one or more portions of the transaction data as training data, testing data, and monitoring period data for testing the set of models. The monitor logic circuitry may pretrain or retrain models in the set of models with the training data, validate the training of the models with the testing data, and perform testing on the set of models with the monitoring period data.

After determining the training, testing, and monitoring period datasets, the monitor logic circuitry may select one or more models to include in the set of models (element 3415). In other words, prior to testing a set of models, a model library may be populated with multiple models for testing. The models in the library may comprise new models or existing models that have not been trained in this embodiment, but have established methodologies, hyperparameters or key parameters, and input features. Thus, through interaction with a user, based on parameters established for the testing, based on information from a prior test and/or other information, and/or the like, the monitor logic circuitry may choose models from the model library to include in a set of models for testing.

With the set of models identified, the monitor logic circuitry may select, for each model in the set, a build sample from the training dataset (element 3420). The build sample may comprise the entire training dataset for at least some models in the set and/or may comprise a portion of the training dataset for at least some models in the set. For instance, if the transaction data represent a large dataset such as a dataset that spans many years, multiple decades, or the like, the build sample may include one or more than one time periods or time frames within the transaction data. To illustrate, assuming the transaction dataset includes credit history data for multiple customers over a period of 20 years, the build sample may include a 5 year period of the transaction data from 20 to 15 years ago as well as a 5 year period from 10 to 5 years ago. In some embodiments, a more recent time period such as the last three years may be reserved as a monitoring period dataset.

With the set of models identified, the monitor logic circuitry may also determine, for each model in the set, input features to input at an input layer of each model in the set as a tensor (element 3425). The monitor logic circuitry may determine the input features of each model to determine configurations for tensors based on the transaction data to communicate to the input layer of each of the models.

After determining the configuration of the tensors for the transaction data, the monitor logic circuitry may train each model in the set with the build sample selected for each model (element 3430). In some embodiments, training may involve training one or more new models. In some embodiments, training may involve training one or more existing models. And, in some embodiments, training may involve training a combination of one or more new models and one or more existing models.

Figure 4:
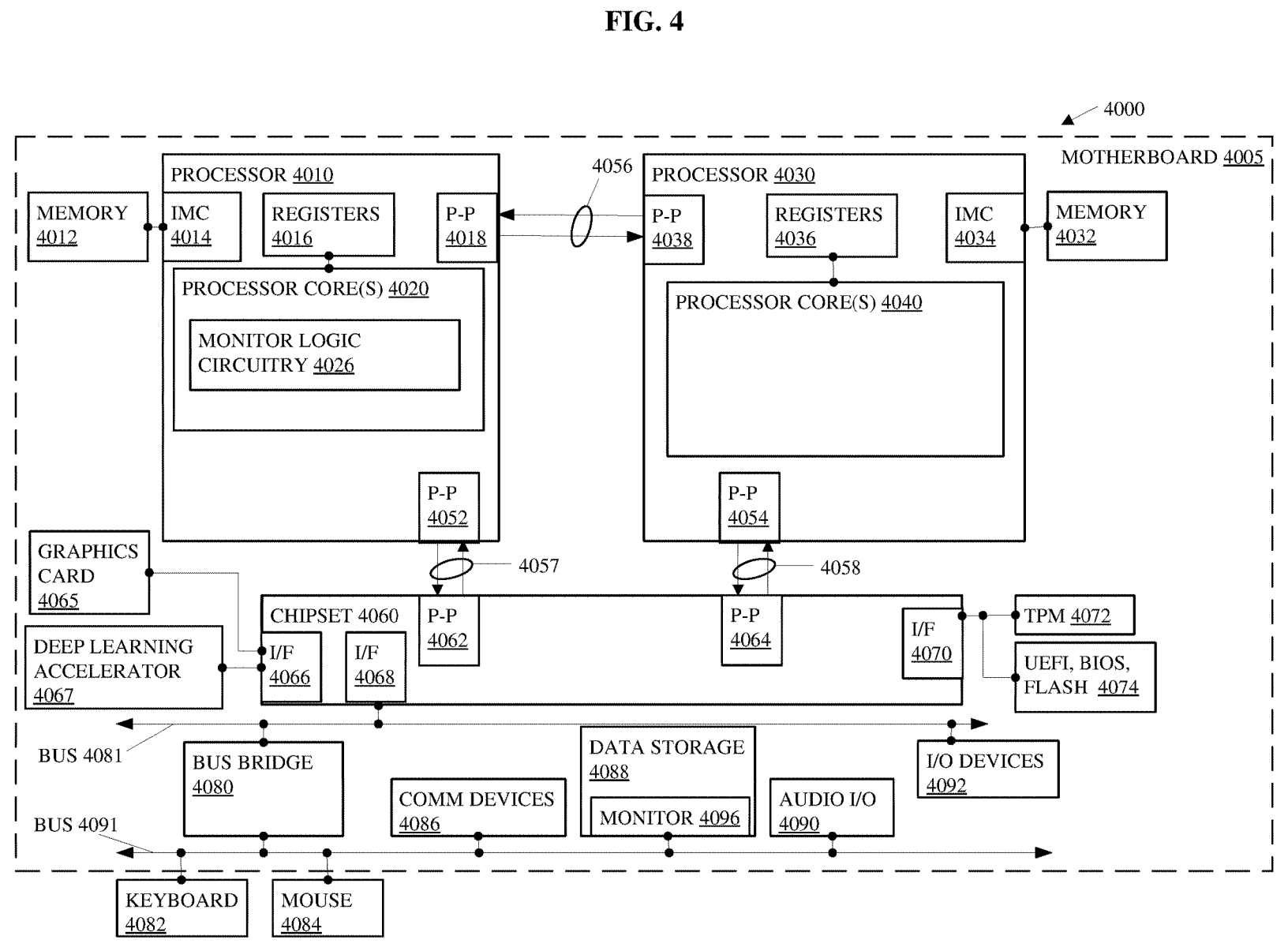

FIG. 4 illustrates an embodiment of a system 4000 such as a server of the server(s) 1010 shown in FIG. 1A or the apparatus 1100 shown in FIG. 1B. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include a monitor logic circuitry 4026 such as the monitor logic circuitry 1115 shown in FIG. 1B. The monitor logic circuitry 4026 may represent circuitry configured to implement the functionality of model testing for neural network support within the processor core(s) 4020 or may represent a combination of the circuitry within a processor and a medium to store all or part of the functionality of the monitor logic circuitry 4026 in memory such as cache, the memory 4012, buffers, registers, and/or the like. In several embodiments, the functionality of the monitor logic circuitry 4026 resides in whole or in part as code in a memory such as the monitor logic circuitry 4096 in the data storage unit 4088 attached to the processor 4010 via a chipset 4060 such as the monitor logic circuitry 1125 shown in FIG. 1B. The functionality of the monitor logic circuitry 4026 may also reside in whole or in part in memory such as the memory 4012 and/or a cache of the processor. Furthermore, the functionality of the monitor logic circuitry 4026 may also reside in whole or in part as circuitry within the processor 4010 and may perform operations, e.g., within registers or buffers such as the registers 4016 within the processor 4010, registers 4036 within the processor 4030, or within an instruction pipeline of the processor 4010 or the processor 4030.

In other embodiments, more than one of the processor 4010 and 4030 may comprise functionality of the monitor logic circuitry 4026 such as the processor 4030 and/or the processor within the deep learning accelerator 4067 coupled with the chipset 4060 via an interface (I/F) 4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the unified extensible firmware interface (UEFI), BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the monitor logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 5:
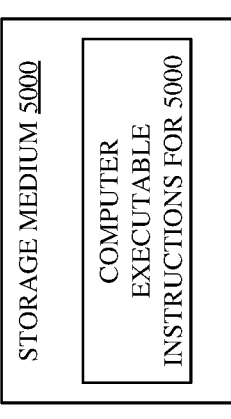
FIGS. 5-6 depict embodiments of a storage medium and a computing platform such as the server(s) shown in FIG. 1A-FIG. 1B.

FIG. 5 illustrates an example of a storage medium 5000 to store processor data structures. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
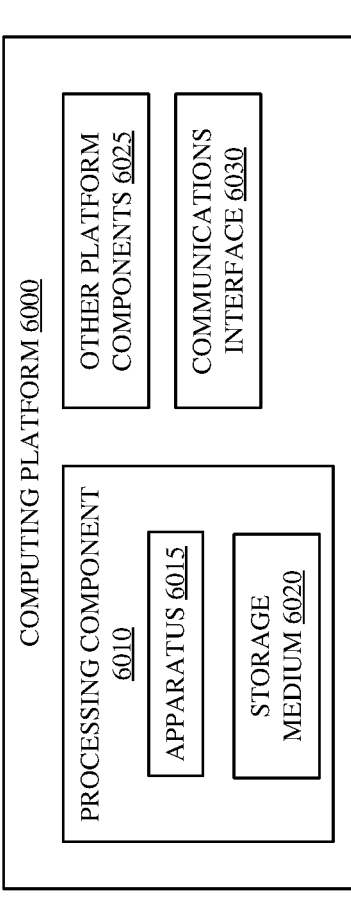

FIG. 6 illustrates an example computing platform 6000. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein such as the monitor logic circuitry 1015 and 1115 illustrated in FIGS. 1A and 1B, respectively. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the Open-Flow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

What is claimed is:

1. A method comprising:
    determining a plurality of predictive models from a library of predictive models, each of the plurality of predictive models trained with a respective training dataset and validated with a respective testing dataset;

testing each of the plurality of predictive models with a monitoring period dataset during a monitoring period;

performing residual modeling on each of the plurality of predictive models during the monitoring period, the residual modeling inputting input feature tensors of input features and auto-correlating or cross-correlating the input feature tensors with past, current, or successive tensors to determine which of the input features contribute to a respective residual for each of the plurality of predictive models;

determining a respective count associated with each of the input features;

based on the respective count associated with each of the input features, classifying each of the input features as exogenous or endogenous with a respective probability associated with a respective classification thereof; and generating and displaying a report identifying each of the input features with the respective classification thereof and the respective probability associated therewith.

2. The method of claim 1 further comprising:

ranking the input features based on contributions to residuals for the plurality of predictive models.

3. The method of claim 2 further comprising:

ranking the input features based on results of a vote comprising the respective count or a respective weighted count associated with each of the input features.

4. The method of claim 3 further comprising;

classifying each of the input features based on the respective count or the respective weighted count associated with each of the input features as exogenous or endogenous.

5. The method of claim 1 further comprising:

analyzing each of the plurality of predictive models to determine the input features that contributed to the respective residual for each of the plurality of predictive models based on values associated with the input features; and determining one of the input features contributes to the respective residual for any of the plurality of predictive models when one of the values associated with the one of the input features exceeds a correlation threshold.

6. The method of claim 1 further comprising:

outputting a respective indicator related to a respective goodness of fit of each of the plurality of predictive models.

7. A system comprising:

a processor; and memory configured to store instructions that, when executed by the processor, cause the processor to:

determine a plurality of predictive models from a library of predictive models, each of the plurality of predictive models trained with a respective training dataset and validated with a respective testing dataset;

test each of the plurality of predictive models with a monitoring period dataset during a monitoring period;

perform residual modeling on each of the plurality of predictive models during the monitoring period, the residual modeling inputting input feature tensors of input features and auto-correlating or cross-correlating the input feature tensors with past, current, or successive tensors to determine which of the input features contribute to a respective residual for each of the plurality of predictive models;

determine a respective count associated with each of the input features;

based on the respective count associated with each of the input features, classify each of the input features as exogenous to-or endogenous with a respective probability associated with a respective classification thereof; and generate and display a report identifying each of the input features with the respective classification thereof and the respective probability associated therewith.

8. The system of claim 7 wherein the instructions, when executed by the processor, further cause the processor to rank the input features based on contributions to residuals for the plurality of predictive models.

9. The system of claim 8 wherein the instructions, when executed by the processor, further cause the processor to rank the input features based on results of a vote comprising the respective count or a respective weighted count of each of the input features.

10. The system of claim 9 wherein the instructions, when executed by the processor, further cause the processor to classify each of the input features based on the respective count or the respective weighted count of each of the input features as exogenous or endogenous.

11. The system of claim 7 wherein the instructions, when executed by the processor, further cause the processor to analyze each of the plurality of predictive models to determine the input features that contributed to the respective residual for each of the plurality of predictive models based on values associated with the input features and determine one of the input features contributes to the respective residual for any of the plurality of predictive models when one of the values associated with the one of the input features exceeds a correlation threshold.

12. The system of claim 7 wherein the instructions, when executed by the processor, further cause the processor to output a respective indicator related to a respective assessed accuracy of each of the plurality of predictive models.

13. A non-transitory computer-readable medium comprising instructions that, when executed by a processor, cause the processor to:

determine a plurality of predictive models from a library of predictive models, each of the plurality of predictive models trained with a respective training dataset and validated with a respective testing dataset;

test each of the plurality of predictive models with a monitoring period dataset during a monitoring period;

perform residual modeling on each of the plurality of predictive models during the monitoring period, the residual modeling inputting input feature tensors of input features and auto-correlating or cross-correlating the input feature tensors with past, current, or successive tensors to determine which of the input features contribute to a respective residual for each of the plurality of predictive models;

determine a respective count associated with each of the input features;

based on the respective count associated with each of the input features, classify each of the input features as exogenous or endogenous with a respective probability associated with a respective classification thereof; and generate and display a report identifying each of the input features with the respective classification thereof and the respective probability associated therewith.

14. The non-transitory computer-readable medium of claim 13 wherein the instructions, when executed by the processor, further cause the processor to rank the input features based on contributions to residuals for the plurality of predictive models.

15. The non-transitory computer-readable medium of claim 14 wherein the instructions, when executed by the processor, further cause the processor to rank the input features based on results of a vote comprising the respective count or a respective weighted count of each of the input features.

16. The non-transitory computer-readable medium of claim 15 wherein the instructions, when executed by the processor, further cause the processor to classify each of the input features based on the respective count or the respective weighted count of each of the input features as exogenous or endogenous.

17. The non-transitory computer-readable medium of claim 13 wherein the instructions, when executed by the processor, further cause the processor to analyze each of the plurality of predictive models to determine the input features that contributed to the respective residual for each of the plurality of predictive models based on values associated with the input features and determine one of the input features contributes to the respective residual for any of the plurality of predictive models when one of the values associated with the one of the input features exceeds a correlation threshold.

18. The non-transitory computer-readable medium of claim 13 wherein the instructions, when executed by the processor, further cause the processor output a respective indicator related to one or more of a respective magnitude of residuals, a respective number of the input features identified as contributors, a respective degree of freedom, and a respective chi-squared distribution associated with each of the plurality of predictive models.

* * * * *